United States Patent
Stephenne et al.

(10) Patent No.: US 10,251,046 B2
(45) Date of Patent: Apr. 2, 2019

(54) SYSTEM AND METHOD FOR EFFICIENT LINK DISCOVERY IN WIRELESS NETWORKS

(71) Applicant: Huawei Technologies Co., Ltd., Shenzhen (CN)

(72) Inventors: Alex Stephenne, Stittsville (CA); Aaron Callard, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 349 days.

(21) Appl. No.: 14/727,520

(22) Filed: Jun. 1, 2015

(65) Prior Publication Data
US 2016/0353271 A1    Dec. 1, 2016

(51) Int. Cl.
H04W 8/00    (2009.01)

(52) U.S. Cl.
CPC .................. *H04W 8/005* (2013.01)

(58) Field of Classification Search
None
See application file for complete search history.

(56) References Cited

U.S. PATENT DOCUMENTS

| | | | | |
|---|---|---|---|---|
| 2006/0262747 A1* | 11/2006 | Posamentier | ........... | G01S 3/043 370/329 |
| 2008/0316103 A1* | 12/2008 | Rofougaran | ............ | G01S 7/412 342/386 |
| 2009/0052384 A1* | 2/2009 | Zisimopoulous | ....... | H04L 47/14 370/329 |
| 2010/0268981 A1* | 10/2010 | Xiang | ................. | H04L 41/0654 714/2 |
| 2011/0082846 A1 | 4/2011 | Bamba et al. | | |

(Continued)

FOREIGN PATENT DOCUMENTS

| CN | 101099305 A | 1/2008 |
|---|---|---|
| CN | 103313404 A | 9/2013 |

(Continued)

OTHER PUBLICATIONS

Barati, N., et al., "Directional Cell Search for Millimeter Wave Cellular Systems," 2014 IEEE 15th International Workshop on Signal Processing Advances in Wireless Communications (SPAWC), Jun. 22-25, 2014, pp. 120-124.

(Continued)

*Primary Examiner* — Chi H Pham
*Assistant Examiner* — Vladislav Y Agureyev
(74) *Attorney, Agent, or Firm* — Slater Matsil, LLP (57) ABSTRACT

It is possible to achieve fast high-frequency link discovery by communicating location parameters identifying a spatial location of a mobile device over a low-frequency interface to a low-frequency access point (AP). The location parameters are then used to identify antenna configuration parameters (e.g., precoders, etc.) for communicating discovery signals between the mobile device and a high-frequency access point. In one embodiment, the low-frequency AP relays the location parameters to the high-frequency AP, which uses the spatial location of the mobile device to perform link discovery. In another embodiment, the low-frequency AP communicates high-frequency antenna configuration parameters to the mobile device over the low-frequency interface.

5 Claims, 4 Drawing Sheets

(56) References Cited

U.S. PATENT DOCUMENTS

| | | | | |
|---|---|---|---|---|
| 2012/0220315 | A1* | 8/2012 | Karttaavi | G01S 3/046 455/457 |
| 2013/0094440 | A1* | 4/2013 | Moshfeghi | H04W 88/06 370/328 |
| 2013/0171998 | A1* | 7/2013 | Liu | H04W 16/28 455/446 |
| 2014/0003369 | A1* | 1/2014 | Josiam | H04W 72/0406 370/329 |
| 2014/0073337 | A1* | 3/2014 | Hong | H04W 16/28 455/452.1 |
| 2014/0218236 | A1* | 8/2014 | Sadeghi | H04W 16/28 342/367 |
| 2014/0308962 | A1 | 10/2014 | Zhang et al. | |
| 2015/0003393 | A1 | 1/2015 | Xia et al. | |
| 2015/0045048 | A1* | 2/2015 | Xu | H04W 4/023 455/452.1 |
| 2015/0085838 | A1* | 3/2015 | Benjebbour | H04W 16/28 370/336 |
| 2015/0173004 | A1* | 6/2015 | Nigam | H04W 48/16 370/331 |
| 2015/0230263 | A1* | 8/2015 | Roy | H04W 36/0083 455/452.2 |
| 2015/0326359 | A1* | 11/2015 | Subramanian | H04L 5/0023 370/330 |
| 2015/0373593 | A1* | 12/2015 | Ryu | H04W 36/0083 370/332 |
| 2016/0020876 | A1* | 1/2016 | Raghavan | H04W 76/10 370/252 |
| 2016/0021548 | A1* | 1/2016 | Raghavan | H04W 16/28 370/329 |
| 2016/0047884 | A1* | 2/2016 | Zhang | H04B 7/0617 342/458 |
| 2016/0100347 | A1* | 4/2016 | Ryu | H04W 76/026 455/445 |
| 2016/0135090 | A1* | 5/2016 | Krishnamoorthy | H04W 16/28 370/329 |
| 2016/0191159 | A1* | 6/2016 | Aoyama | H04B 10/116 398/172 |
| 2016/0211898 | A1* | 7/2016 | Cai | H04B 7/0617 |
| 2016/0330643 | A1* | 11/2016 | Sahin | H04W 16/14 |
| 2017/0311217 | A1* | 10/2017 | Jung | H04W 36/04 |

FOREIGN PATENT DOCUMENTS

| | | | | |
|---|---|---|---|---|
| CN | 103812546 A | | 5/2014 | |
| WO | WO 2014036150 A1 | * | 3/2014 | ........ H04W 36/0083 |
| WO | WO 2015106237 A1 | * | 7/2015 | ............ H04W 16/14 |

OTHER PUBLICATIONS

Barros, J., et al. "Effective Delay Control in Online Network Coding," IEEE INFOCOM, Apr. 19-25, pp. 208-216.

* cited by examiner

SYSTEM AND METHOD FOR EFFICIENT LINK DISCOVERY IN WIRELESS NETWORKS

TECHNICAL FIELD

The present invention relates generally to telecommunications, and in particular embodiments, to systems and methods for efficient link discovery in wireless networks.

BACKGROUND

Millimeter wave (mmW) bands between 30 and 300 GHz are considered a promising candidate for next-generation cellular networks to relieve spectral congestion in conventional cellular frequencies. However, cellular communication at these high-frequencies will likely require highly directional transmissions to achieve suitable signal range. This reliance on directional beamforming complicates initial cell searching since the mobile device and the high-frequency access point must jointly search over a potentially large angular directional space to locate suitable antenna configuration parameters for establishing the high-frequency interface. Accordingly, techniques for achieving fast link discovery for high-frequency interfaces are desired.

SUMMARY OF THE INVENTION

Technical advantages are generally achieved, by embodiments of this disclosure which describe systems and methods for efficient link discovery in wireless networks.

In accordance with an embodiment, a method for link discovery in high-frequency communications is provided. In this example, the method includes transmitting location parameters over a low-frequency interface extending between a mobile device and a low-frequency access point. The location parameters indicate a spatial location of the mobile device in a cell. The method further includes receiving a high-frequency antenna configuration parameter over the low-frequency interface. The high-frequency antenna configuration parameter specifies a target angle or a target spatial location for configuring a high-frequency antenna array of the mobile device during link discovery, and performing link discovery in accordance with the high-frequency antenna configuration parameter to establish a high-frequency interface between the high-frequency antenna array of the mobile device and a high-frequency access point of the cell. An apparatus for performing this method is also provided.

In accordance with another embodiment, another method for link discovery in high-frequency communications is provided. In this example, the method includes receiving location parameters from a low-frequency access point. The location parameters were communicated to the low-frequency access point by a user equipment over a low-frequency interface, and indicate a spatial location of the mobile device in a cell. The method further includes identifying one or more precoders associated with the spatial location of the mobile device in a database of the high-frequency access point, and performing link discovery in accordance with the one or more precoders to establish a high-frequency interface between the high-frequency access point of the cell and the mobile device. An apparatus for performing this method is also provided.

In accordance with another embodiment, yet another method for link discovery in high-frequency communications is provided. In this example, the method includes determining that a mobile device has entered a coverage area of a high-frequency access point, determining a spatial location of the high-frequency access point in accordance with a priori information available to the mobile device, identifying a precoder for configuring a high-frequency antenna array of the mobile device at the spatial location of the high-frequency access point, and performing link discovery using the precoder to establish a high-frequency interface between the high-frequency antenna array of the mobile device and the high-frequency access point. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. As discussed herein, the term "low-frequency signal" refers to an electromagnetic signal having a wavelength that is longer than ten millimeters. Likewise, the term "high-frequency signal" refers to an electromagnetic signal having a wavelength that is shorter than ten millimeters. High-frequency signals may also be referred to as millimeter wave (mmW) radio signals.

Aspects of this disclosure achieve fast high-frequency link discovery by communicating location parameters identifying a spatial location of a mobile device over a low-frequency interface to a low-frequency access point (AP). In one embodiment, the low-frequency AP relays the location parameters to a high-frequency AP, which uses the spatial location of the mobile device to perform link discovery. For example, the high-frequency AP may use the location parameters to select one or more precoders for transmitting high-frequency discovery signals to the mobile device. In another embodiment, the low-frequency AP communicates high-frequency antenna configuration parameters to the mobile device over the low-frequency interface. For example, the high-frequency antenna configuration parameters may specify a target angle for establishing a high-frequency interface with the high-frequency AP. The target angle may be a direction of arrival (DoA), angle of arrival (AoA), direction of departure (DoD), or angle of departure (AoD) that was either previously used to establish a high-frequency interface with the high-frequency AP at a spatial location near that of the mobile device, or that was computed during an offline simulation, e.g., using offline modeling tools such as ray tracing. As another example, the high-frequency antenna configuration parameter may specify a target spatial location for configuring a high-frequency antenna array of the mobile device during link discovery. The target spatial location may specify a spatial location of the high-frequency AP or a spatial location of a radio reflection point that reflects high-frequency wireless signals between a spatial location of the mobile device and the high-frequency AP. Like the target angle, the spatial location of the radio reflection point may be identified through historical communications, or via offline simulation. The mobile device may use the target spatial location to compute a target angle (e.g., DoA, AoA, etc.). Upon receiving, or otherwise computing, the target angle, the mobile device may use the target to select one or more precoders for transmitting, or listening for, high-frequency discovery signals to/from the high-frequency AP. Additional aspects of this link and/or radio-reflection-point vector may also be taken into account, e.g., stability or likelihood of the link not going away, interference to other nodes, etc. Notably, this type of information may be difficult for the mobile device to measure itself, and may be communicated via control messaging.

Aspects of this disclosure also achieve fast high-frequency link discovery by storing a spatial location of high-frequency AP, radio reflection points, virtual reflected objects, or virtual transmission points/area, as a priori information in the mobile device. For example, the mobile device may store the spatial location of high-frequency APs from which it had been previously attached. As another example, the mobile device may download spatial locations of high-frequency APs in a general location (e.g., a city, etc.) from the internet or some other available source. Upon entering a coverage area, the mobile device may use as spatial location of the corresponding high-frequency AP to select one or more precoders for high-frequency link-discovery. These and other aspects are discussed in greater detail below.

A virtual reflected object is an object that is presumed to be present when computing reflected angles from physics models, e.g., Snells law, knife edge defraction, mirror reflection. This would typically represent a large reflector (building) which both the device and AP have clear visibility of. The presence of virtual reflected objects can be determined through mining of historical data or through site surveys. A virtual transmission point/area is an area from which signals are presumed to come from. For instance, a virtual transmission point/area may include an urban canyon (street, alley, etc), or physical structure which the transmitted signal would travel down (corridor, pipe, ductwork, etc.).

Figure 1:
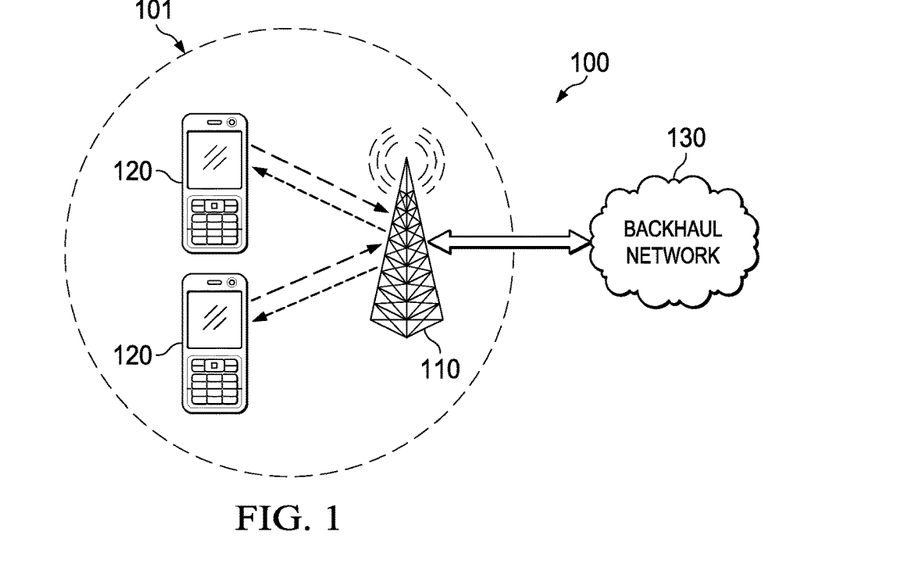
FIG. 1 illustrates a diagram of an embodiment wireless communications network.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), a relay station, and other wirelessly enabled devices. In some embodiments, the network 100 may comprise various other wireless devices, such as relays, low power nodes, etc.

As referred to herein, the term "precoder" refers to a set of weights applied to a wireless signal in order to map multiple antennas into at least one logical stream of data. Precoders can be applied during signal reception or signal transmission using beamforming techniques. Precoders may be applied in the digital domain, the analog domain, or a mixture of the two.

Figure 2A:
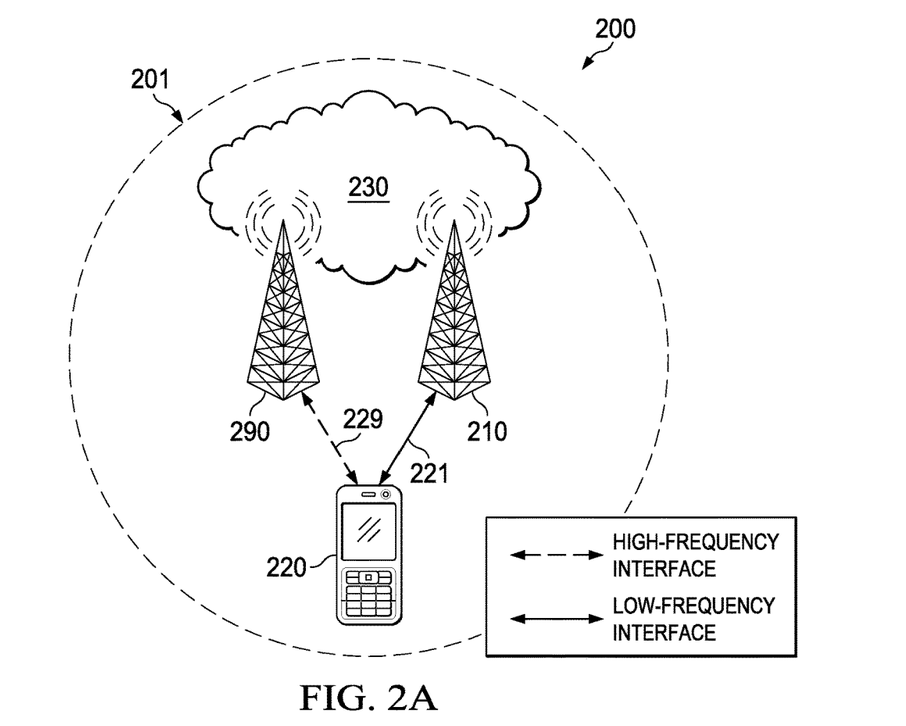
FIGS. 2A-2B illustrate diagrams of embodiment wireless networks adapted for fast high-frequency link discovery.
Figure 2B:
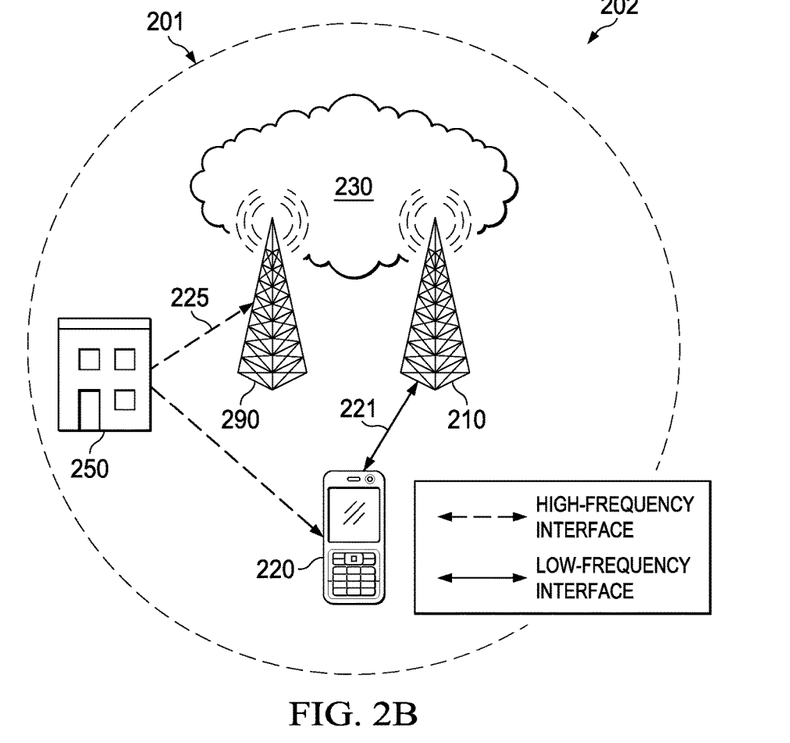

Aspects of this disclosure achieve fast high-frequency link discovery by communicating location parameters specifying a spatial location of mobile device over a low-frequency interface to a low-frequency AP. FIGS. 2A-2B illustrates an embodiment wireless networks 200, 202 for achieving high-frequency link discovery through the communication of location parameters over a low-frequency interface. As shown, the embodiment wireless network 200 comprises a low-frequency access point (AP) 210 and a high-frequency AP 290, which are interconnected via a backhaul network 230. While FIGS. 2A-2B depict the low-frequency AP 210 and the high-frequency access point 290 as being separate network devices that are interconnected through a backhaul network 23, it should be appreciated that embodiments of this disclosure are equally applicable to scenarios in which the low-frequency AP 210 and the high-frequency AP 290 are co-located on the same base station.

In this example, a mobile device 220 establishes a low-frequency interface 221 with the low-frequency AP 210 before completing high-frequency link discovery. Notably, low-frequency link discovery can typically be completed more quickly than high-frequency link discovery because low-frequency wireless signals are typically less spatially selective than high-frequency wireless signals. In other words, high-frequency antenna configuration parameters (e.g., precoders, etc.) may typically require a higher degree of precision than those low-frequency antenna configuration parameters, and consequently the discovery period for selecting high-frequency antenna configuration parameters is oftentimes much longer than the discovery period for selecting low-frequency high-frequency antenna configuration parameters.

After establishing the low-frequency interface 221, the mobile device 220 communicates location parameters to the low-frequency AP 210 via the low-frequency interface 221. The location parameters indicate a spatial location/position of the mobile device 220 within a coverage area 201 of the high-frequency AP 290. Other parameters related to high-frequency link discovery may also be exchanged over the low-frequency interface 221, such as information (e.g., time, frequency, sequence, etc.) pertaining to pilot/beacon signals.

In some embodiments, the low-frequency AP 210 relays the location parameters to the high-frequency AP 290. If the low-frequency AP 210 is separate from the high-frequency AP 290, then the location parameters may be communicated over the backhaul network 230. The backhaul network 230 may be any wireless or wireline interconnection between the low-frequency AP 210 and the high-frequency AP 290. If the low-frequency AP 210 and the high-frequency AP are co-located at the same base station, then the location parameters may simply be forwarded over an internal connection, e.g., a bus between the low-frequency AP 210 and the high-frequency AP 290. The high-frequency AP 290 may then use the spatial location of the mobile device 230 to perform high-frequency link discovery. For example, the high-frequency AP 290 may select one or more transmit precoders based on the spatial location of the mobile device 220. In one example, the high-frequency AP 290 uses historical information to select transmit precoders that performed well for other UEs positioned at or near the spatial location of the mobile device 220. In another example, the high-frequency AP 290 references simulation results to select transmit precoders that are likely to perform well at the spatial location of the mobile device 220. The high-frequency AP 290 may then transmit discovery signals using each of the transmit precoders, and select the precoder providing the best performance (e.g., highest reception quality at the mobile device 220) based on feedback signaling from the mobile device 220. The selected precoder may then be used to establish the high-frequency interface 229. In other embodiments, high-frequency parameters are relayed from the low-frequency AP to the mobile station via a third party, e.g., a relay station, a helping UE, etc.

In the same (or different) embodiments, the low-frequency AP 210 returns a high-frequency antenna configuration parameter to the mobile device 220 over the low-frequency interface 221. In some examples, the low-frequency AP 210 has access to historical information or simulation results that associate antenna configuration parameters with different spatial locations within the coverage 201. For instance, the low-frequency AP 210 may store a table that associates antenna configuration parameters with corresponding spatial locations within the coverage area 201. In other examples, the low-frequency AP 210 obtains the high-frequency antenna configuration parameter indirectly from another device, such as the high-frequency AP 290 or a central controller. For instance, the low-frequency AP 210 may communicate the spatial location of the mobile device 220 to another device (e.g., the high-frequency AP 290 or a controller having access to historical information and/or simulation results), which may return a corresponding high-frequency antenna configuration parameter to the low-frequency AP 210. The low-frequency AP 210 may then communicate the high-frequency antenna configuration parameter to the mobile device 220 via the low-frequency interface 121.

The high-frequency antenna configuration parameter may specify a target angle or a target spatial location for configuring a high-frequency antenna array of the mobile device 220 during link-discovery. In one example, the high-frequency antenna configuration parameter specifies a direction of arrival (DoA) or angle of arrival (AoA) for receiving discovery signals transmitted by the high-frequency AP 290.

In another example, the high-frequency antenna configuration parameter specifies a direction of departure (DoD) or angle of departure (AoD) for transmitting discovery signals (e.g., sounding reference signals, etc.) to the high-frequency AP 290. In yet another example, the high-frequency antenna configuration parameter specifies a spatial location of the high-frequency AP 290. In such an example, the mobile device 220 may determine a target angle by comparing the spatial location of the high-frequency AP 290 with the spatial location of the mobile device 220. The mobile device 220 may use the target angle to select one or more precoders for high-frequency link discovery. For example, the mobile device 220 may use the target angle to select one or more reception precoders, which may be used to listen for discovery signals transmitted by the high-frequency AP 290. As another example, the mobile device 220 may use the target DoA or AoA to select one or more transmit precoders, which may be used to transmit discovery signals (e.g., sounding reference signals, etc.) to the high-frequency AP 290. In some embodiments, the location parameters communicated over the low-frequency interface 221 are used to generate precoders for both the high-frequency AP 290 and the mobile device 220. For example, the low-frequency AP 210 may communicate the location parameters to the high-frequency AP 290, as well as communicate high-frequency antenna configuration parameters to the mobile device 220 via the low-frequency interface 221. The high-frequency AP 290 may use the location information of the mobile device 220 to select one or more transmit precoders for transmitting discovery signals, and the mobile device 220 may utilize the high-frequency antenna configuration parameters to select one or more reception precoders for receiving the discovery signals transmitted by the high-frequency AP 290. Alternatively, the mobile device 220 may utilize the high-frequency antenna configuration parameters to select one or more transmit precoders for transmitting discovery signals, and the high-frequency AP 290 may use the location information of the mobile device 220 to select one or more reception precoders for receiving the discovery signals transmitted by the mobile device 220. Notably, the high-frequency antenna configuration parameters may be communicated over the low-frequency interface well before (several hours, days, etc.) the mobile device 220 participates in high-frequency link discovery.

FIG. 2A illustrates the high-frequency interface 229 as traversing a line-of-sight between the mobile device 220 and the high-frequency AP 290. However, it should appreciated that the embodiment high-frequency link discovery techniques described herein can also be used to establish indirect high-frequency interfaces, such as those that pass through a radio reflection point. FIG. 2B illustrates a high-frequency radio interface 225 that reflects off a radio reflection point 250. The radio reflection point 250 may be any object or structure that reflects a high-frequency wireless signal. In this example, the radio reflection point 250 is depicted as a building. However, it should be appreciated that a radio reflection point may include objects/structures having various sizes and orientations. For example, a radio-reflection point may include a window or wall of a structure, a billboard, a body of water (e.g., a fountain, pond, etc.), or any other object tending to reflect high-frequency wireless signals.

In this example, the high-frequency antenna configuration parameter communicated over the low-frequency interface 221 may specify a spatial location of the radio reflection point as the target spatial location for configuring the high-frequency antenna array of the mobile device 220. For instance, the mobile device 220 may use the spatial location of the radio reflection point as the target spatial location to select a precoder, or beam-width, for transmitting or receiving high-frequency wireless signals reflected off the radio reflection point 250. Likewise, the high-frequency AP 290 may associate the spatial location of the mobile device 220 (as specified by location parameters relayed by the low-frequency AP 210) with precoders configured to transmit or receive high-frequency wireless signals reflected off the radio reflection point 250. In some embodiments, the mobile device 220 and or high-frequency AP 290 communicate discovery signals using precoders for both direct and indirect high-frequency interfaces, and select the precoder(s) providing the best performance for establishing the high-frequency interface. In embodiments, one or more of the mobile device 220, the low-frequency AP 210, and the high-frequency AP 290 may include components for tracking an absolute directional reference and/or a relative or absolute spatial location, e.g., digital compass, gyroscope, accelerometer, positioning system such as a global positioning system (GPS), etc. The terms AoA, AoD, DoD, and DoA may refer to either a relative or an absolute angle/direction with respect to the mobile device or an external reference (e.g., true north).

Figure 3:
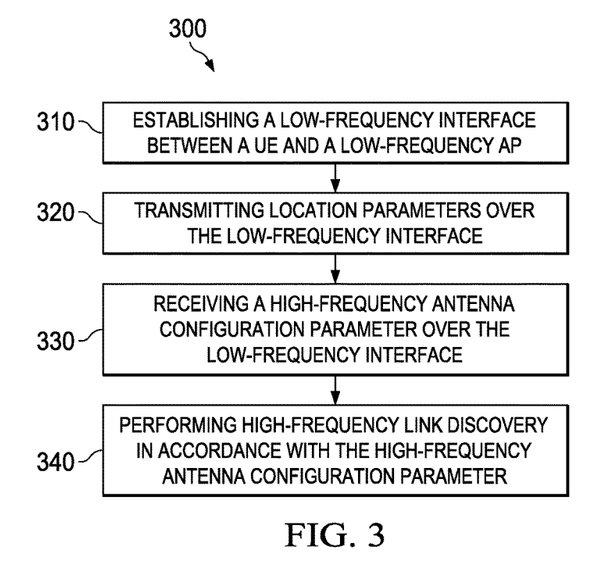
FIG. 3 illustrates a flowchart of an embodiment method for fast high-frequency link discovery.

Aspects of this disclosure provide embodiment methods for high-frequency link discovery. FIG. 3 illustrates an embodiment method 300 for performing high-frequency link discovery, as might be performed by a mobile device. As shown, the method 300 begins with step 310, where the mobile device establishes a low-frequency interface with a low-frequency AP. The low-frequency AP may be positioned in, or nearby, a coverage area of a high-frequency AP, e.g., the same coverage area, a neighboring coverage area. Next, the method 300 proceeds to step 320, where the mobile device transmits location parameters over the low-frequency interface to the low-frequency AP. The location parameters specify a spatial location of the mobile device. Thereafter, the method 300 proceeds to step 330, where the mobile device receives a high-frequency antenna configuration parameter from the low-frequency AP via the low-frequency interface. The high-frequency antenna configuration parameter may specify a target angle or a target position for configuring (e.g., selecting a precoder, selecting a beam-width, etc.) a high-frequency antenna array of the mobile device during link discovery. Finally, the method 300 proceeds to step 340, where the mobile device performs high-frequency link discovery in accordance with the high-frequency antenna configuration parameter. This may include selecting one or more precoders based on the high-frequency antenna configuration parameter, and then transmitting, or listening for, discovery signals to/from the high-frequency AP using the precoders.

Figure 4:
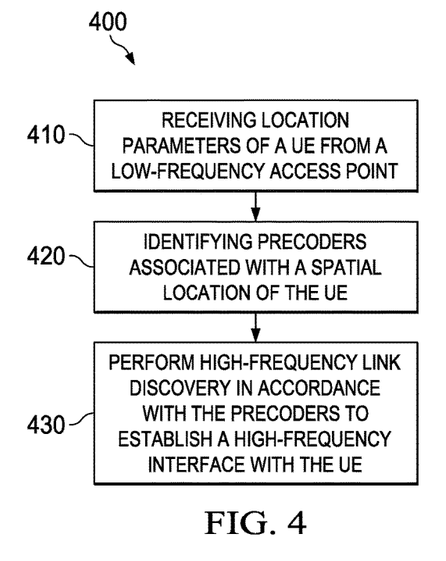
FIG. 4 illustrates a flowchart of another embodiment method for fast high-frequency link discovery.

FIG. 4 illustrates an embodiment method 400 for performing high-frequency link discovery, as might be performed by a high-frequency AP. As shown, the method 400 begins at step 410, where the high-frequency AP receives location parameters specifying a spatial location of a mobile device from a low-frequency AP. Next, the method 400 proceeds to step 420, where the high-frequency AP identifies precoders associated with the spatial location of the mobile device. The precoders may be selected using historical information, or simulation results, that associate precoders with various spatial locations within a coverage area of the high-frequency AP. Thereafter, the method 400 proceeds to step 430, where the high-frequency AP performs high-frequency link discovery in accordance with the precoders to establish a high-frequency interface with the mobile device.

Figure 5:
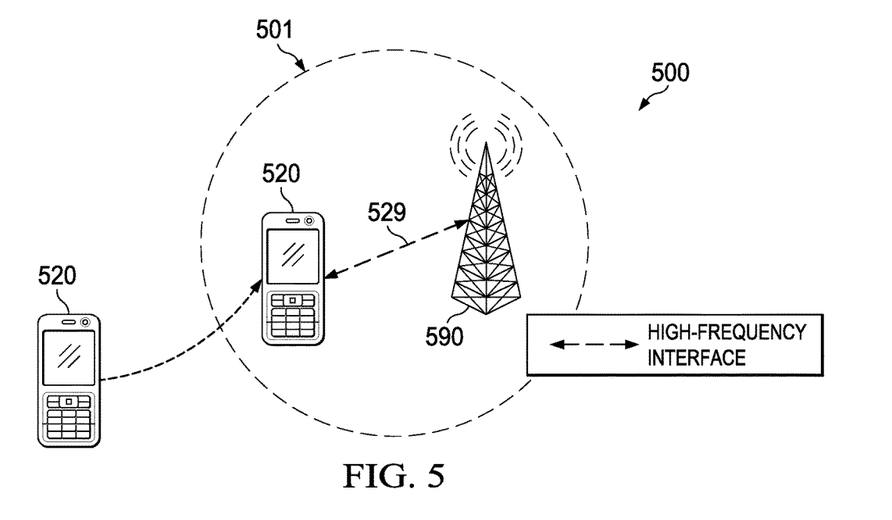
FIG. 5 illustrate a diagram of another embodiment wireless network adapted for fast high-frequency link discovery.

Aspects of this disclosure further provide techniques for achieving high-frequency link discovery based on a priori information of a mobile device. FIG. 5 illustrates an embodiment wireless network 500 for achieving high-frequency link discovery using a priori information of a mobile device. As shown, the embodiment wireless network 500 comprises a high-frequency access point (AP) 590 adapted to provide wireless access to a mobile device 520. In this example, the mobile device 520 migrates into a coverage area 501 of the high-frequency AP 590. Upon realizing that it entered the coverage area 501 of the high-frequency AP 590, the mobile device 520 references a priori information to identify a spatial location of the high-frequency AP 590. The a priori information of the mobile device 520 may be a table identifying spatial locations of various high-frequency APs within a region, e.g., a city, a neighborhood, etc. In some embodiments, the mobile device 520 obtains the table from a third party source prior to the mobile device 520 ever coming into contact with the high-frequency AP 590. As an example, the mobile device 520 may download a table indicating spatial locations of APs upon entering a region, e.g., upon traveling to a city, etc. As another example, the mobile device 520 may learn the spatial location of an AP (e.g., the high-frequency AP 590) from another user device, e.g., a helping UE, etc. In other embodiments, the mobile device 520 may build/maintain the table based on prior sessions/discovery-activities of the mobile device 520. For example, the mobile device 520 may keep a log of spatial locations for APs in which the mobile device 520 has come into contact with, e.g., discovered or established a previous attachment. This may enable the mobile device 520 to quickly discover high-frequency APs in areas frequented by the mobile device 520. After identifying the spatial location of the high-frequency AP via a priori information, the mobile device 520 may select one or more precoders, and perform high-frequency link discovery to establish the high-frequency interface 529.

In embodiments, the a priori information of the mobile device 520 may include a list of high-frequency access points, a map of locations [x,y,z or a small geographic grid] of the high-frequency APs, and various communication parameters (e.g., frequency band, interface, code, load, spectrum efficiency, etc.) for each high-frequency access point. The a priori information of the mobile device 520 may also include target angles (e.g., DoDs, DoAs, etc.) to use at various locations when attempting to communicate or discover one of the high-frequency APs. The a priori information of the mobile device 520 (e.g., map, etc.) may be updated using directional/positional tracking components and/or other information available to the mobile device 520, including information received over low-frequency interfaces, information obtained during interactions with high-frequency APs, information downloaded from the internet, etc. The map may identify locations of high-frequency APs as a function of geographic location and/or other measurable parameters, e.g., relative location to low-frequency APs, altitude, air pressure, speed, sound level, output of proximity detectors, etc. Similar information (e.g., maps, etc.) may be stored by the high-frequency AP 590, as well as by components in the networks 200, 202 discussed above, e.g., the mobile device 220, the low-frequency AP 210, and/or the high-frequency APs 290.

Figure 6:
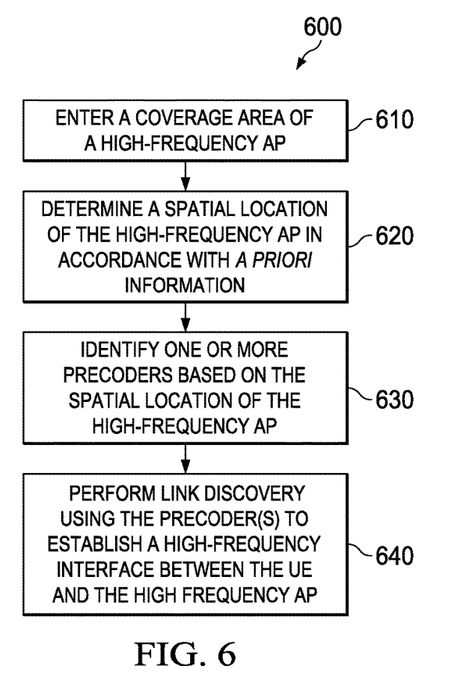
FIG. 6 illustrates a flowchart of yet another embodiment method for fast high-frequency link discovery.

FIG. 6 illustrates an embodiment method 600 for performing high-frequency link discovery, as might be performed by a mobile device. As shown, the method 600 begins with step 610, where the mobile device enters a coverage area of a high-frequency AP. Thereafter, the method 600 proceeds to step 620, where the mobile device determines a spatial location of the high-frequency AP in accordance with a priori information of the mobile device. Subsequently, the method 600 proceeds to step 630, where the mobile device identifies a precoder based on the spatial location of the high-frequency AP. Finally, the method 600 proceeds to step 640, where the mobile device performs high-frequency link discovery using the identified precoder (s) to establish a high-frequency interface with the high-frequency AP.

Location parameters can be used to identify high-frequency antenna configuration parameters for configuring high-frequency antenna array of a mobile device during link discovery. Performing link discovery in accordance with a high-frequency antenna configuration parameter may include selecting a precoder in accordance with a target angle or a target spatial location specified by a high-frequency antenna configuration parameter, and applying the selected precoder to signals transmitted via the high-frequency antenna array over the high-frequency interface.

Selecting the precoder in accordance with the target angle or the target spatial location specified by the high-frequency antenna configuration parameter may include identifying two or more precoders in accordance with the target angle or the target spatial location specified by the high-frequency antenna configuration, configuring the high-frequency antenna array in accordance with each of the two or more precoders to listen for a discovery signal transmitted by the high-frequency access point, and selecting, from the two or more precoders, the precoder that provides a highest reception quality for the discovery signal of the high-frequency access point. The high-frequency antenna configuration parameter may specify a direction of arrival (DoA) or an angle of arrival (AoA) as the target angle for directing the high-frequency antenna array of the mobile device. The high-frequency antenna configuration parameter may specify the target spatial location for directing the high-frequency antenna array. Selecting the precoder in accordance with the target spatial location specified by the high-frequency antenna configuration parameter may include identifying a target direction of arrival (DoA) in accordance with a difference between the spatial location of the mobile device and the target spatial location specified by the high-frequency antenna configuration parameter, and selecting the precoder in accordance with the target DoA.

The high-frequency antenna configuration parameter may specify a spatial location of the high-frequency access point as the target spatial location for directing the high-frequency antenna array of the mobile device. The high-frequency antenna configuration parameter may specify a spatial location of a radio reflection point as the target spatial location for directing the high-frequency antenna array. The radio reflection point may reflect high-frequency signals communicated between the mobile device and the high-frequency access point.

The low-frequency interface may be adapted to transport radio signals having wavelengths that are longer than ten millimeters. The high-frequency interface is adapted to transport millimeter wave (mmW) radio signals having wavelengths that are shorter than ten millimeters.

Multiple high frequency configuration parameters may be received over the low-frequency interface. A mobile device may select the high-frequency antenna configuration parameter from the multiple high-frequency configuration parameter based on a spatial location of the mobile device.

The low-frequency access point may be separate and distinct from the high-frequency access point. Alternatively, the low-frequency access point and the high-frequency access point may be components on the same base station. In some embodiments, methods of this disclosure may be performed by a mobile device comprising a processor, and a non-transitory computer readable storage medium storing programming for execution by the processor. The programming may include instructions to execute steps of the method.

Communication parameters may include a high-frequency antenna configuration parameter specifying a target angle or a target spatial location for configuring a high-frequency antenna array of the mobile device during link discovery. A high frequency access point may prompt or instruct a low-frequency access point to communicate high-frequency antenna configuration parameters to the mobile device over the low-frequency interface. This may trigger the mobile device to perform link discovery in accordance with the high-frequency antenna configuration parameter to establish a high-frequency interface.

Performing link discovery in accordance with the one or more transmit precoders to establish the high-frequency interface may include transmitting discovery signals in accordance with each of the one or more precoders, and selecting, from the one or more transmit precoders, a transmit precoder providing a highest reception quality at the mobile device. A database may map spatial locations within the cell to historical antenna configuration parameters used for communications between the high-frequency access point and mobile devices located at those spatial locations. In some embodiments, methods of this disclosure may be performed by a high-frequency access point comprising a processor, and a non-transitory computer readable storage medium storing programming for execution by the processor. The programming may include instructions to execute steps of the method.

Figure 7:
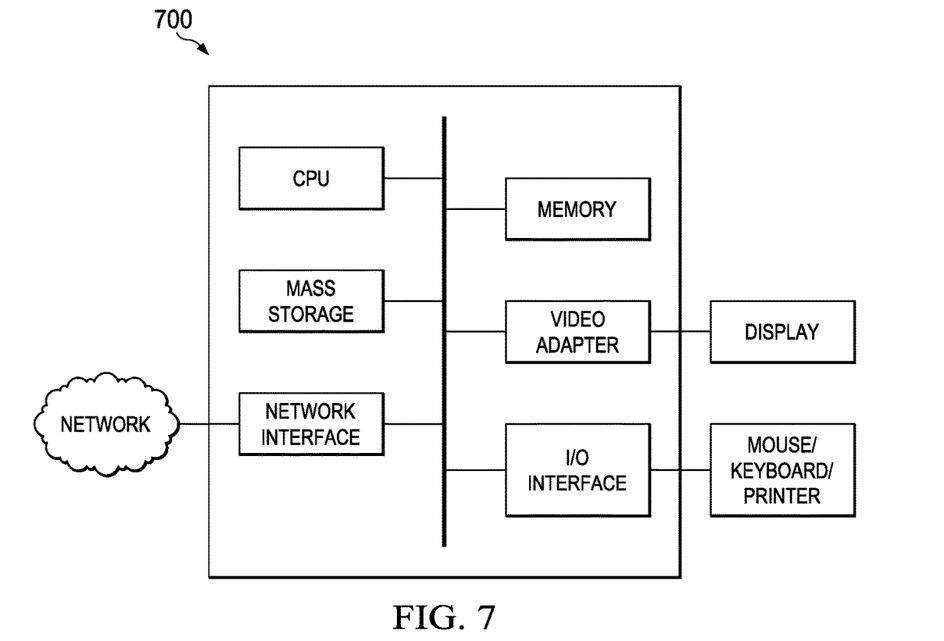
FIG. 7 illustrates a diagram of an embodiment processing system.

FIG. 7 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 8:
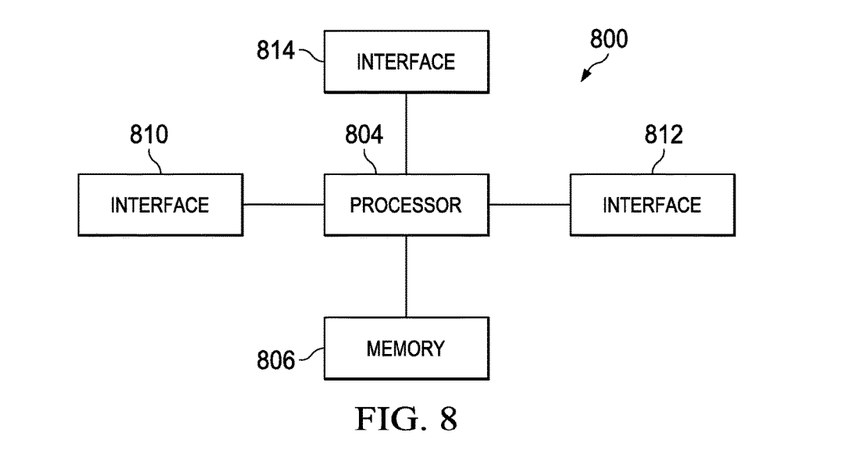
FIG. 8 illustrates a diagram of an embodiment communications device.

FIG. 8 illustrates a block diagram of an embodiment of a communications device 800, which may be equivalent to one or more devices (e.g., UEs, NBs, etc.) discussed above. The communications device 800 may include a processor 804, a memory 806, and a plurality of interfaces 810, 812, 814, which may (or may not) be arranged as shown in FIG. 8. The processor 804 may be any component capable of performing computations and/or other processing related tasks, and the memory 806 may be any component capable of storing programming and/or instructions for the processor 804. The interfaces 810, 812, 814 may include any component or collection of components that allows the communications device 800 to communicate with other devices. In one embodiment, the communications device 800 comprises a mobile device, the interface 810 comprises a wireless transceiver coupled to a low-frequency wireless interface (e.g., low-frequency antenna array), and the interface 812 comprises a wireless transceiver coupled to a high-frequency wireless interface (e.g., a high-frequency antenna array). In another embodiment, the communications device 800 comprises an AP, the interface 810 comprises a transceiver coupled to a wireless interface (e.g., antenna array), and the interface 812 comprises a backhaul interface for communicating with other network-side devices, e.g., a neighboring AP, a central controller, etc.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for link discovery in high-frequency communications, the method comprising:
   receiving, by a low-frequency access point, location parameters of a mobile device over a low-frequency interface of the low-frequency access point, wherein the location parameters indicate a spatial location of the mobile device in a cell;
   selecting, by the low-frequency access point, a high-frequency angle of arrival (AoA) or angle of departure (AoD) for configuring a high-frequency antenna array of the mobile device during link discovery based on the location parameters received from the mobile device over the low-frequency interface, the high-frequency AoA or AoD for configuring a high-frequency antenna array of the mobile device during link discovery of a high-frequency access point, wherein selecting the high-frequency AoA or AoD based on the location parameters received over the low-frequency interface comprises selecting the high-frequency AoA or AoD in accordance with a database that maps spatial locations within the cell to historical AoAs or AoDs used for communications between the high-frequency access point and mobile devices located at those spatial locations; and
   transmitting, by the low-frequency access point, the high-frequency AoA or AoD to the mobile device over the low-frequency interface, wherein the low-frequency access point is separate and distinct from a high-frequency access point.

2. The method of claim 1, wherein the low-frequency interface is adapted to transport radio signals having wavelengths that are longer than ten millimeters, and wherein the high-frequency antenna array is adapted to transmit millimeter wave (mmW) radio signals having wavelengths that are shorter than ten millimeters.

3. A low-frequency access point comprising:
   a processor; and
   a computer readable storage medium storing programming for execution by the processor, the programming including instructions to:
   receive location parameters of a mobile device over a low-frequency interface of the low-frequency access point, wherein the location parameters indicate a spatial location of the mobile device in a cell;
   select a high-frequency angle of arrival (AoA) or angle of departure (AoD) based on the location parameters received from the mobile device over the low-frequency interface, the high-frequency AoA or AoD for configuring a high-frequency antenna array of the mobile device during link discovery of a high-frequency access point, wherein the instructions to select the high-frequency AoA or AoD based on the location parameters received over the low-frequency interface comprise instructions to select the high-frequency AoA or AoD in accordance with a database that maps spatial locations within the cell to historical AoAs or AoDs used for communications between the high-frequency access point and mobile devices located at those spatial locations; and
   transmit the high-frequency AoA or AoD to the mobile device over the low-frequency interface, wherein the low-frequency access point is separate and distinct from the high-frequency access point.

4. The low-frequency access point of claim 3, wherein the low-frequency interface is adapted to transport radio signals having wavelengths that are longer than ten millimeters, and wherein the high-frequency interface is adapted to transport millimeter wave (mmW) radio signals having wavelengths that are shorter than ten millimeters.

5. A computer program product comprising a non-transitory computer readable storage medium storing programming, the programming including instructions to:

receive location parameters of a mobile device over a low-frequency interface extending between the mobile device and a low-frequency access point, wherein the location parameters indicate a spatial location of the mobile device in a cell;

select a high-frequency angle of arrival (AoA) or angle of departure (AoD) for configuring a high-frequency antenna array of the mobile device during link discovery based on the location parameters received from the mobile device over the low-frequency interface, wherein the instructions to select the high-frequency AoA or AoD based on the location parameters received over the low-frequency interface comprise instructions to select the high-frequency AoA or AoD in accordance with a database that maps spatial locations within the cell to historical AoAs or AoDs used for communications between a high-frequency access point and mobile devices located at those spatial locations; and transmit the high-frequency AoA or AoD to the mobile device over the low-frequency interface, wherein the low-frequency access point is separate and distinct from the high-frequency access point.

* * * * *